(12) United States Patent
Meier

(10) Patent No.: US 11,838,492 B2
(45) Date of Patent: *Dec. 5, 2023

(54) HEAD-MOUNTABLE DEVICE WITH OBJECT MOVEMENT DETECTION

(71) Applicant: Apple Inc., Cupertino, CA (US)

(72) Inventor: Peter Meier, Los Gatos, CA (US)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/509,349

(22) Filed: Oct. 25, 2021

(65) Prior Publication Data
US 2022/0046222 A1 Feb. 10, 2022

Related U.S. Application Data

(63) Continuation of application No. 16/015,833, filed on Jun. 22, 2018, now Pat. No. 11,190,753.

(60) Provisional application No. 62/564,849, filed on Sep. 28, 2017.

(51) Int. Cl.
| | |
|---|---|
| *H04N 13/275* | (2018.01) |
| *G06T 7/292* | (2017.01) |
| *G06T 19/00* | (2011.01) |
| *H04N 13/332* | (2018.01) |
| *G06V 20/20* | (2022.01) |
| *H04N 13/00* | (2018.01) |

(52) U.S. Cl.
CPC .......... *H04N 13/275* (2018.05); *G06T 7/292* (2017.01); *G06T 19/006* (2013.01); *G06V 20/20* (2022.01); *H04N 13/332* (2018.05); *H04N 2013/0081* (2013.01)

(58) Field of Classification Search
None
See application file for complete search history.

(56) References Cited

U.S. PATENT DOCUMENTS

| | | | | |
|---|---|---|---|---|
| 2010/0208045 | A1* | 8/2010 | Willmann | A61H 3/061 348/E7.091 |
| 2017/0177937 | A1* | 6/2017 | Harmsen | G06V 20/00 |

OTHER PUBLICATIONS

David Reverter Valeiras et al., "An Asynchronous Neuromorphic Event-Driven Visual Part-Based Shape Tracking," IEEE Transactions on Neural Networks and Learning Systems, vol. 26, No. 12, Dec. 2015, pp. 3045-3059.

* cited by examiner

*Primary Examiner* — Heather R Jones
(74) *Attorney, Agent, or Firm* — Fernando & Partners, LLP

(57) ABSTRACT

Various implementations disclosed are for detecting moving objects that are in a field of view of a head-mountable device (HMD). In various implementations, the HMD includes a display, an event camera, a non-transitory memory, and a processor coupled with the display, the event camera and the non-transitory memory. In some implementations, the method includes synthesizing a first optical flow characterizing one or more objects in a field of view of the event camera based on depth data associated with the one or more objects. In some implementations, the method includes determining a second optical flow characterizing the one or more objects in the field of view of the event camera based on event image data provided by the event camera. In some implementations, the method includes determining that a first object of the one or more objects is moving based on the first optical flow and the second optical flow.

20 Claims, 5 Drawing Sheets

HEAD-MOUNTABLE DEVICE WITH OBJECT MOVEMENT DETECTION

CROSS-REFERENCE TO RELATED APPLICATIONS

This application is a continuation of U.S. patent application Ser. No. 16/015,833, filed on Jun. 22, 2018, which claims priority to U.S. Provisional Patent App. No. 62/564,849, filed on Sep. 28, 2017, which are both hereby incorporated by reference in their entirety. This application is also related to U.S. Provisional Patent App. No. 62/430,859, filed on Dec. 6, 2016, which is hereby incorporated by reference in its entirety.

TECHNICAL FIELD

The present disclosure generally relates to a head-mountable device with object movement detection.

BACKGROUND

A head-mountable device is a display device that is worn on or around the head of a user. Head-mountable devices are available in a variety of different form factors. For example, some head-mountable devices resemble a helmet, whereas other head-mountable devices resemble a pair of eyeglasses. Most head-mountable devices include at least one display that the user can view when the head-mountable device is worn by the user. Some head-mountable devices include multiple displays. For example, some head-mountable devices include two displays, one for each eye. Head-mountable devices have a variety of applications. For example, head-mountable devices are often used in gaming, aviation, engineering and medicine.

Since a head-mountable device is in such close proximity to the user when the head-mountable device is being used, the amount of heat that the head-mountable device generates may need to be controlled. The amount of heat that the head-mountable device generates typically correlates to the amount of power consumed by the head-mountable device. As such, the amount of power that the head-mountable device consumes may need to be controlled. Typically, the amount of power consumed by a head-mountable device depends on the hardware and/or software capabilities of the head-mountable device. For example, a head-mountable device with higher processing power, a larger memory and/or a faster refresh rate typically consumes more power than a head-mountable device with lower processing power, a smaller memory and/or a slower refresh rate. However, limiting the hardware and/or software capabilities of the head-mountable device usually hampers performance of the head-mountable device and degrades the user experience.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
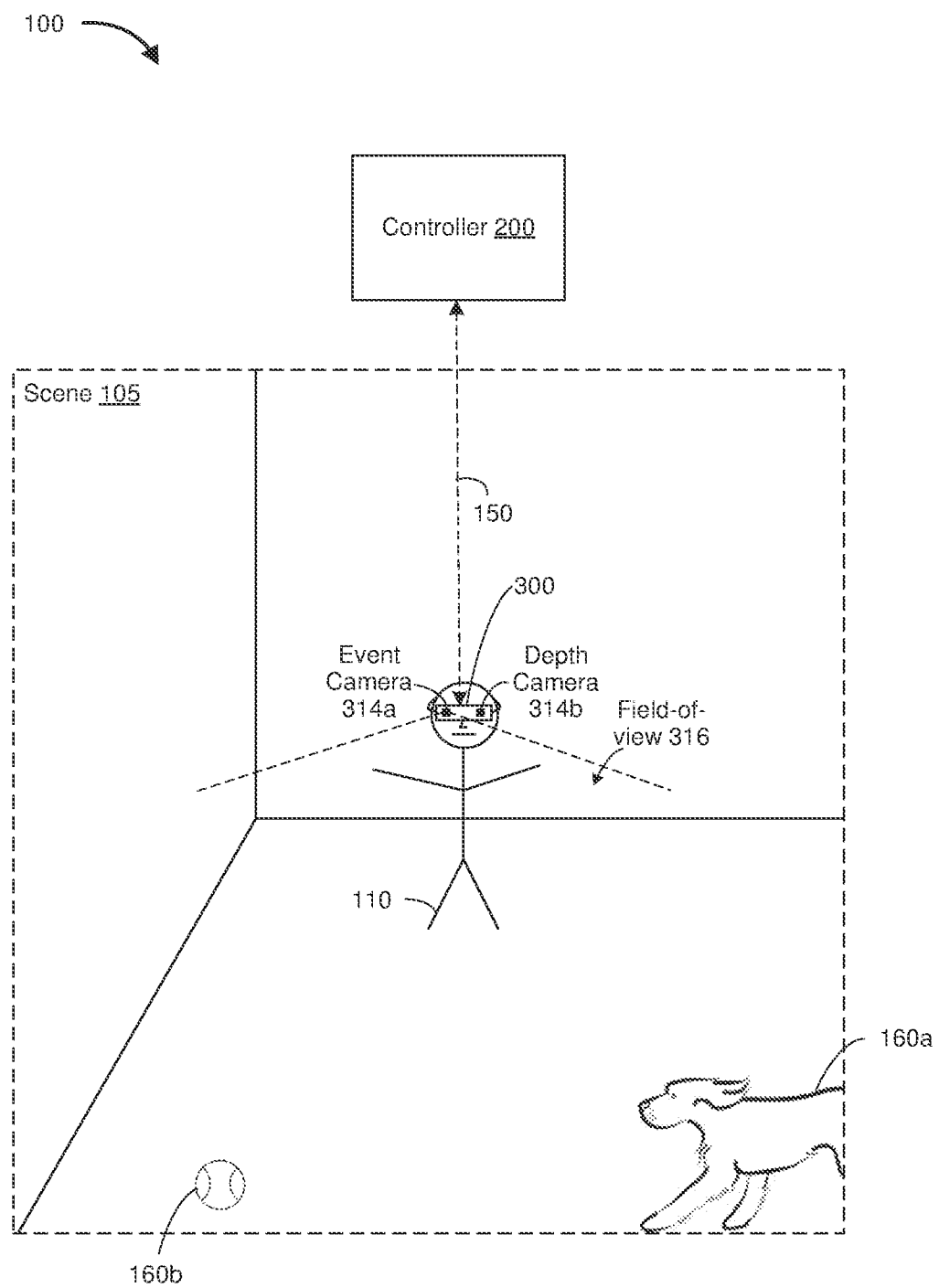
FIG. 1 is a block diagram of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for detecting moving objects that are in a field of view of a head-mountable device (HMD). In various implementations, the HMD includes a display, an event camera, a non-transitory memory, and one or more processors coupled with the display, the event camera and the non-transitory memory. In some implementations, the method includes synthesizing a first optical flow characterizing one or more objects in a field of view of the event camera based on depth data associated with the one or more objects. In some implementations, the method includes determining a second optical flow characterizing the one or more objects in the field of view of the event camera based on event image data provided by the event camera. In some implementations, the method includes determining that a first object of the one or more objects is moving based on the first optical flow and the second optical flow.

In accordance with some implementations, a device includes one or more processors, a non-transitory memory, and one or more programs. In some implementations, the one or more programs are stored in the non-transitory memory and are executed by the one or more processors. In some implementations, the one or more programs include instructions for performing or causing performance of any of the methods described herein. In accordance with some implementations, a non-transitory computer readable storage medium has stored therein instructions that, when executed by one or more processors of a device, cause the device to perform or cause performance of any of the methods described herein. In accordance with some implementations, a device includes one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

In various implementations, a head-mountable device (HMD) includes a camera and a display. In some implementations, the camera includes a scene-facing camera. In some implementations, the display presents visual representations of objects that are in a field of view of the camera. In various implementations, the HMD is movable. For example, a user wearing the HMD can tilt and/or rotate the HMD, for example, by tilting and/or rotating the head of the user. As the HMD moves, the objects that are in the field of view of the camera change. In various implementations, the HMD may need to identify objects that are moving. In some implementations, the HMD may need to identify objects that are moving while the HMD is also moving (e.g., while the HMD is being rotated, tilted and/or translated).

In various implementations, the HMD utilizes image data from an event camera to identify objects that are moving. In some implementations, the HMD synthesizes a first optical flow (e.g., an expected optical flow) that characterizes one or more objects in a field of view of the event camera. In some implementations, the HMD synthesizes the first optical flow based on depth data associated with the object(s). In some implementations, the HMD determines a second optical flow (e.g., a current optical flow) that characterizes the object(s) in the field of view of the event camera based on event image data provided by the event camera. In some implementations, the HMD determines that one of the objects in the field of view of the event camera is moving based on the first optical flow and the second optical flow. For example, the HMD determines that one of the objects is moving in response to the current optical flow being different from the expected optical flow. In some implementations, the HMD presents an indication that an object at the scene is moving. In some implementations, the HMD presents the indication when the display of the HMD is displaying content that does not correspond to scene (e.g., when the display is presenting content that corresponds to a game, a movie or a video chat instead of displaying visual representations of objects at the scene). In some implementations, the HMD indicates which of the objects in the field of view of the event camera is moving.

FIG. 1 is a block diagram of an example operating environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a controller 200 and a head-mountable device (HMD) 300. In the example of FIG. 1, the HMD 300 is located at a scene 105 (e.g., a geographical location such as a meeting room). In the example of FIG. 1, the scene 105 includes various objects such as a dog 160a and a ball 160b. As illustrated in FIG. 1, the HMD 300 can be worn by a user 110.

In some embodiments, the controller 200 is configured to manage and coordinate an augmented reality/virtual reality (AR/VR) experience for the user 110. In some embodiments, the controller 200 includes a suitable combination of software, firmware, and/or hardware. The controller 200 is described in greater detail below with respect to FIG. 2. In some embodiments, the controller 200 is a computing device that is local or remote relative to the scene 105. For example, in some embodiments, the controller 200 is a local server located within the scene 105. In some embodiments, the controller 200 is a remote server located outside of the scene 105 (e.g., a cloud server, central server, etc.). In some embodiments, the controller 200 resides at a smartphone, a tablet, a personal computer, a laptop computer, or the like. In some embodiments, the controller 200 is communicatively coupled with the HMD 300 via one or more wired or wireless communication channels 150 (e.g., BLUETOOTH, IEEE 802.11x, IEEE 802.16x, IEEE 802.3x, etc.). In some embodiments, the controller 200 is communicatively coupled with a calibration device (not shown) via one or more wired or wireless communication channels (e.g., BLUETOOTH, IEEE 802.11x, IEEE 802.16x, IEEE 802.3x, etc.). In some embodiments, the HMD 300 is communicatively coupled with the calibration device via one or more wired or wireless communication channels (e.g., BLUETOOTH, IEEE 802.11x, IEEE 802.16x, IEEE 802.3x, etc.). In some embodiments, the calibration device enables calibration of the controller 200 and/or the HMD 300. In some embodiments, the calibration device includes a smartphone, a tablet, a personal computer, a laptop computer, or the like.

In some embodiments, the HMD 300 is configured to present the AR/VR experience to the user 110. In some embodiments, the HMD 300 includes a suitable combination of software, firmware, and/or hardware. The HMD 300 is described in greater detail below with respect to FIG. 3. In some embodiments, the functionalities of the controller 200 are provided by and/or combined with the HMD 300.

According to some embodiments, the HMD 300 presents an augmented reality/virtual reality (AR/VR) experience to the user 110 while the user 110 is virtually and/or physically present within the scene 105. In some embodiments, while presenting an augmented reality (AR) experience, the HMD 300 is configured to present AR content and to enable optical see-through of the scene 105. In some embodiments, while presenting a virtual reality (VR) experience, the HMD 300 is configured to present VR content.

In some embodiments, the user 110 mounts the HMD 300 onto his/her head. For example, in some embodiments, the HMD 300 includes a frame that the user 110 positions on his/her nose and ears. In some embodiments, the HMD 300 includes a strap that the user 110 wears around his/her forehead or chin. In some embodiments, the HMD 300 is attachable to or integrated into a helmet that the user 110 wears on his/her head. In some embodiments, the HMD 300 is attachable to or integrated into a pair of eyeglasses that the user 110 wears.

In various embodiments, the HMD 300 includes an event camera 314a with a field of view 316. In some implementations, the event camera 314a generates event image data in response to detecting a change in the field of view 316. In some implementations, the event image data indicates changes in individual pixels. For example, the event image data indicates which pixel registered a change in its intensity. In some implementations, the event camera 314a outputs a stream of asynchronous spikes. In such implementations, each spike indicates a pixel that recorded a threshold log intensity change. For example, each spike is associated with a pixel location, sign and timing indicating that the pixel corresponding to the pixel location recorded a threshold log intensity change. In some implementations, the output of the event camera 314a encodes changes in the field of view 316 (e.g., instead of encoding the field of view 316 itself), thereby reducing the bitrate and/or improving temporal resolution.

In various implementations, the HMD 300 includes a depth camera 314b that obtains depth data associated with the scene 105. In some implementations, the depth data indicates a distance between the HMD 300 and an object that is located at the scene 105. For example, the depth data indicates how far the dog 160a and/or the ball 160b are from the HMD 300. In some implementations, the depth data indicates a dimension of an object that is located at the scene

105. For example, the depth data indicates dimensions of the dog 160*a* and/or the ball 160*b*. In various implementations, the depth camera 314*b* utilizes methods, devices and/or systems that are associated with active depth sensing. For example, in some implementations, the depth camera 314*b* includes an infrared (IR) illuminator, a filter and an IR camera. In such implementations, the IR illuminator emanates an IR light through the filter creating a dot pattern. In some implementations, the IR camera senses the dot pattern on an object, and computes the distance of the object from the HMD 300 based on a warping of the dot pattern across the object. In some implementations, the depth camera 314*b* has a field of view that is substantially similar to (e.g., overlaps with, for example, coincides with) the field of view 316 of the event camera 314*a*.

In various implementations, the HMD 300 utilizes the event image data from the event camera 314*a* and/or the depth data from the depth camera 314*b* to identify objects that are moving at the scene 105. In some implementations, the HMD 300 identifies a moving object by comparing a current optical flow of the scene 105 with an expected optical flow for the scene 105. In some implementations, the current optical flow of the scene 105 is a function of the dimensions of the scene 105, the dimensions of the objects at the scene 105 and current positions of the objects at the scene 105. In some implementations, the expected optical flow for the scene 105 is a function of the dimensions of the scene 105, the dimensions of the objects at the scene 105 and expected positions of the objects at the scene 105. For example, if the scene 105 is a meeting room, the expected optical flow is a function of dimensions of a conference table in the meeting room, and/or positions of chairs in the meeting room. In some implementations, the HMD 300 utilizes the depth data from the depth camera 314*b* to synthesize the expected optical flow for the scene 105. In some implementations, the HMD 300 utilizes a model (e.g., a three-dimensional (3D) model) of the scene 105 to synthesize the expected optical flow. For example, the HMD 300 retrieves the depth data for the scene 105 from the model, and utilizes the depth data to synthesize the expected optical flow for the scene 105.

In various implementations, the current optical flow accounts for transient objects (e.g., the dog 160*a* and the ball 160*b* shown in FIG. 1), whereas the expected optical flow does not account for the transient objects. Since the current optical flow accounts for transient objects, the current optical flow differs from the expected optical flow when objects appear at the scene 105 and/or when objects at the scene 105 move. For example, the current optical flow changes to indicate the presence of the dog 160*a* and the ball 160*b* at the scene 105. As such, in various implementations, the HMD 300 determines that an object at the scene 105 is moving based on a comparison of the current optical flow and the expected optical flow. In some implementations, the HMD 300 determines that an object at the scene 105 is moving in response to the current optical flow being different from the expected optical flow. In some implementations, the HMD 300 determines which object at the scene 105 is moving based on the difference between the current optical flow and the expected optical flow. In some implementations, the HMD 300 indicates the movement of the object, for example, by displaying an indication (e.g., a notification) on the display of the HMD 300. In various implementations, detecting object movement based on event image data from the event camera 314*a* reduces the bitrate and/or improves temporal resolution, for example, because the event image data encodes changes in the field-of-view 316 (e.g., instead of encoding the field-of-view 316 itself). In various implementations, detecting object movement based on event image data from the event camera 314*a* reduces the power consumption and/or the heat generation of the HMD 300, for example, because the event camera 314*a* generates the event image data in response to detecting a change in the field-of-view 316 (e.g., instead of continuously generating image data even when there are no changes in the field-of-view 316).

Figure 2:
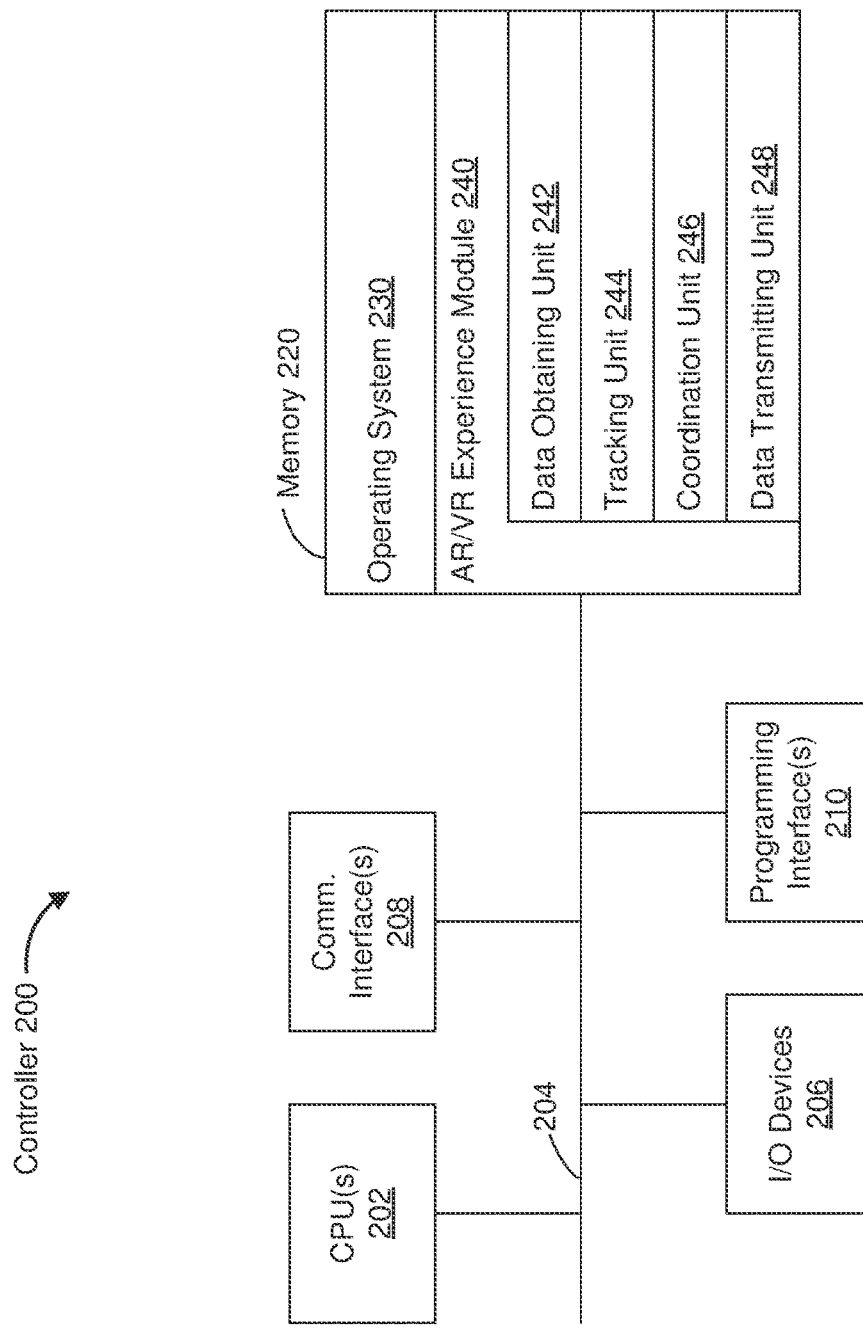
FIG. 2 is a block diagram of an example controller in accordance with some implementations.

FIG. 2 is a block diagram of an example of the controller 200 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the controller 200 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a joystick, one or more microphones, one or more speakers, one or more image sensors, one or more displays, a touch-sensitive display, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. In some embodiments, the memory 220 includes one or more storage devices remotely located from the one or more processing units 202. In some embodiments, the memory 220 includes a non-transitory computer readable storage medium. In some implementations, the memory 220 or the non-transitory computer readable storage medium of the memory 220 stores the following programs, modules and data structures, or a subset thereof including an optional operating system 230 and an augmented reality/virtual reality (AR/VR) experience module 240.

The operating system 230 includes procedures for handling various basic system services and for performing hardware dependent tasks. In some implementations, the AR/VR experience module 240 manages and coordinates one or more AR/VR experiences for one or more users (e.g., a single AR/VR experience for one or more users, or multiple AR/VR experiences for respective groups of one or more users). To that end, in various implementations, the AR/VR experience module 240 includes a data obtaining unit 242, a tracking unit 244, a coordination unit 246, and a data transmitting unit 248.

In some implementations, the data obtaining unit 242 obtains data (e.g., presentation data, interaction data, sensor data, location data, etc.) from at least one of the HMD 300 and the calibration device. To that end, in various implementations, the data obtaining unit 242 includes instructions and/or logic therefor, and heuristics and metadata therefor.

In some implementations, the tracking unit 244 maps the scene 105 and tracks the position/location of at least one of the HMD 300 and the calibration device with respect to the scene 105. To that end, in various implementations, the tracking unit 244 includes instructions and/or logic therefor, and heuristics and metadata therefor.

In some implementations, the coordination unit 246 manages and/or coordinates the AR/VR experience presented by the HMD 300. To that end, in various implementations, the coordination unit 246 includes instructions and/or logic therefor, and heuristics and metadata therefor.

In some implementations, the data transmitting unit 248 transmits data (e.g., presentation data, location data, etc.) to at least one of the HMD 300 and the calibration device. To that end, in various implementations, the data transmitting unit 248 includes instructions and/or logic therefor, and heuristics and metadata therefor.

In the example of FIG. 2, the data obtaining unit 242, the tracking unit 244, the coordination unit 246, and the data transmitting unit 248 are shown as residing on a single device (e.g., the controller 200). A person of ordinary skill in the art will appreciate that, in some implementations, the data obtaining unit 242, the tracking unit 244, the coordination unit 246, and the data transmitting unit 248 are implemented by (e.g., reside at) separate computing devices.

As recognized by those of ordinary skill in the art, items shown separately could be combined and some items could be separated. For example, some modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 3:
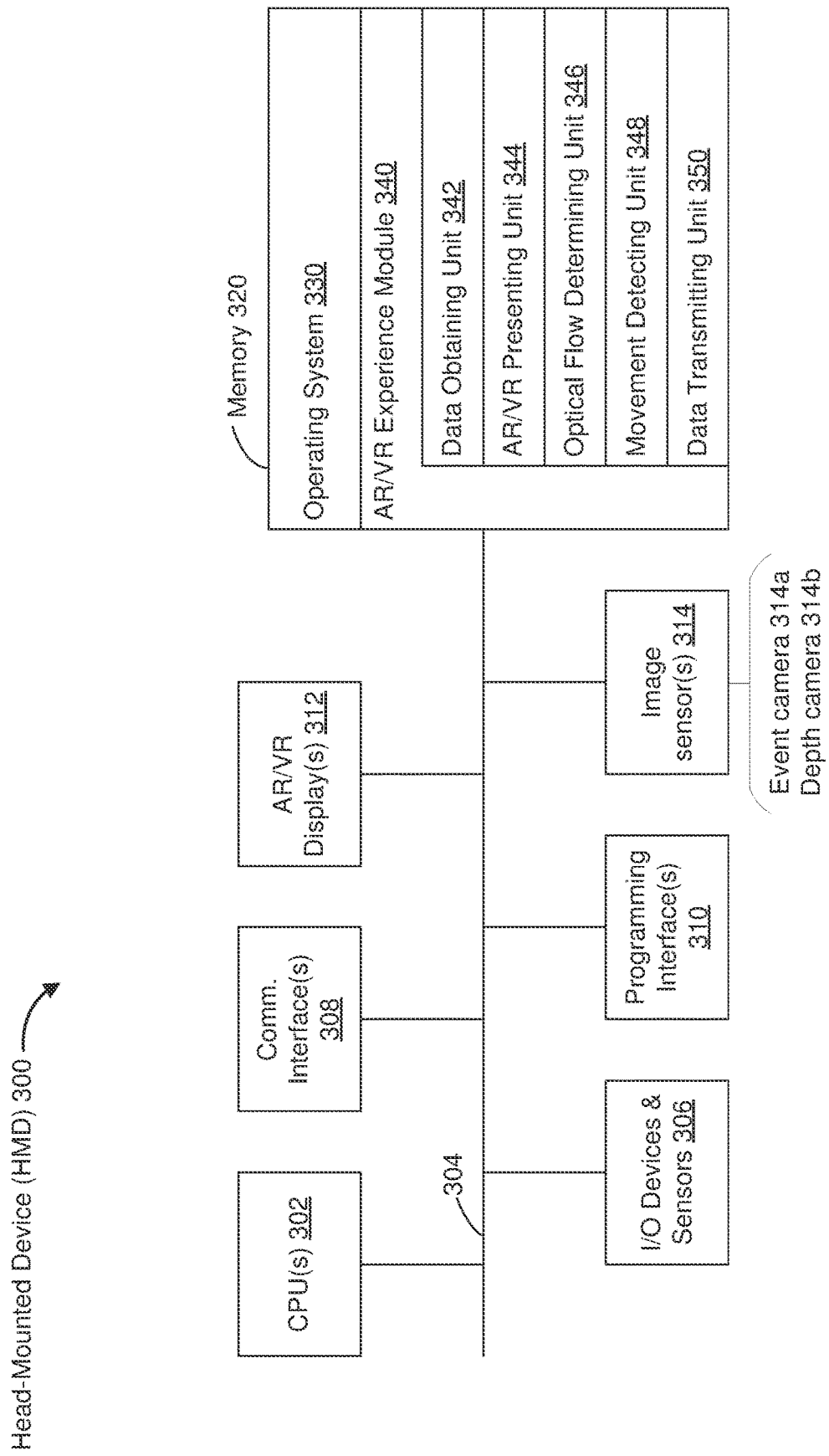
FIG. 3 is a block diagram of an example head-mountable device (HMD) in accordance with some implementations.

FIG. 3 is a block diagram of an example of the head-mountable device (HMD) 300 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the HMD 300 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like), one or more programming (e.g., I/O) interfaces 310, one or more AR/VR displays 312, one or more image sensors 314 (e.g., one or more cameras), a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, and/or the like.

In some implementations, the one or more AR/VR displays 312 present the AR/VR experience to the user. In some embodiments, the one or more AR/VR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some embodiments, the one or more AR/VR displays 312 correspond to diffractive, reflective, polarized, holographic, waveguide displays, etc. In some embodiments, the one or more AR/VR displays 312 are capable of presenting AR and VR content. In some embodiments, the one or more AR/VR displays 312 are capable of presenting AR or VR content.

In some implementations, the one or more image sensors 314 include an event camera 314a and a depth camera 314b. As described herein, in various implementations, the event camera 314a outputs event image data in response to detecting a change in its field of view (e.g., the field of view 316 shown in FIG. 1). In some implementations, the event image data indicates changes in individual pixels. For example, the event image data indicates which pixel registered a change in its intensity. In some implementations, the event camera 314a outputs a stream of asynchronous spikes with pixel location, sign and timing indicating when individual pixels record a threshold log intensity change. In some implementations, the output of the event camera 314a encodes changes in its field of view (e.g., instead of encoding the entire field of view itself) thereby reducing the bitrate and/or improving temporal resolution.

As described herein, in various implementations, the depth camera 314b obtains depth data associated with a scene (e.g., the scene 105 shown in FIG. 1). In some implementations, the depth data indicates a distance between the HMD 300 and an object that is located at the scene. In some implementations, the depth data indicates a dimension of an object that is located at the scene. In various implementations, the depth camera 314b utilizes methods, devices and/or systems that are associated with active depth sensing. For example, in some implementations, the depth camera 314b includes an infrared (IR) illuminator, a filter and an IR camera. In such implementations, the IR illuminator emanates an IR light through the filter creating a dot pattern. In some implementations, the IR camera senses the dot pattern on an object, and computes the distance of the object from the HMD 300 based on a warping of the dot pattern across the object. In some implementations, the depth camera 314b has a field of view that is substantially similar to (e.g., overlaps with, for example, coincides with) the field of view of the event camera 314a. In some implementations, the field of view of the depth camera 314b at least partially overlaps with the field of view of the event camera 314a.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330, and an AR/VR experience module 340.

The operating system 330 includes procedures for handling various basic system services and for performing hardware dependent tasks. In some implementations, the AR/VR experience module 340 presents AR/VR content to the user via the one or more AR/VR displays 312. To that end, in various implementations, the AR/VR experience module 340 includes a data obtaining unit 342, an AR/VR presenting unit 344, an optical flow determining unit 346, a movement detecting unit 348, and a data transmitting unit 350.

In some implementations, the data obtaining unit 342 obtains data (e.g., video data, presentation data, interaction data, sensor data, location data, etc.). For example, in some implementations, the data obtaining unit 342 receives data from at least one of the controller 200 and the calibration device. In some implementations, the data obtaining unit 342 obtains video data. For example, in some implementations, the data obtaining unit 342 receives video frames from the controller 200. In some implementations, the data obtaining unit 342 obtains data that is already stored in the memory 320 (e.g., by retrieving the stored data from the memory 320). In some implementations, the data obtaining unit 342 obtains event image data from the event camera 314a. In some implementations, the data obtaining unit 342 obtains depth data from the depth camera 314b. To that end, in various implementations, the data obtaining unit 342 includes instructions and/or logic therefor, and heuristics and metadata therefor.

In some implementations, the AR/VR presenting unit 344 presents AR/VR content via the one or more AR/VR displays 312. In some implementations, the AR/VR presenting unit 344 renders frames on the AR/VR display(s) 312. For example, in some implementations, the AR/VR presenting unit 344 utilizes the data (e.g., video data) obtained by the data obtaining unit 342 to present video frames on the AR/VR display(s) 312. To that end, in various implementations, the AR/VR presenting unit 344 includes instructions and/or logic therefor, and heuristics and metadata therefor.

In various implementations, the optical flow determining unit 346 determines an optical flow for the scene where the HMD 300 is located. In various implementations, an optical flow is a function of expected positions of objects at the scene, expected dimensions of objects at the scene, and/or dimensions of the scene. As such, in various implementations, as the positions of objects at the scene change, the optical flow for the scene also changes. In some implementations, the optical flow determining unit 346 synthesizes an expected optical flow for the scene. In some implementations, the expected optical flow is a function of depth data associated with the scene. In some implementations, the depth data indicates positions of objects at the scene, dimensions of objects at the scene, and dimensions of the scene. In some implementations, the depth data indicates distances of objects from the HMD 300. In some implementations, the optical flow determining unit 346 obtains the depth data from the depth camera 314b. In some implementations, the optical flow determining unit 346 retrieves the depth data from a model (e.g., a 3D model) of the scene. In some implementations, the optical flow determining unit 346 receives the expected optical flow for the scene from another device (e.g., from the controller 200 shown in FIGS. 1 and 2).

In various implementations, the optical flow determining unit 346 determines a current optical flow for the scene. In some implementations, the current optical flow characterizes objects that are currently in the field of view of the event camera 314a. As such, in various implementations, the optical flow determining unit 346 utilizes event image data from the event camera 314a to determine the current optical flow. In some implementations, the current optical flow is a function of current positions of objects at the scene. Since current positions of objects are sometimes different from the expected positions of objects, the current optical flow is sometimes different from the expected optical flow. In some implementations, the optical flow determining unit 346 determines the current optical flow periodically (e.g., once a second, once a minute, once a week, etc.). In some implementations, the optical flow determining unit 346 determines the current optical flow at random (e.g., pseudo-random) points of time. In some implementations, the optical flow determining unit 346 determines the current optical flow in response to receiving an input. For example, in some implementations, the optical flow determining unit 346 determines the current optical flow in response to receiving a request to identify moving objects at the scene. In some implementations, the optical flow determining unit 346 determines the current optical flow in response to receiving a request to identify changes at the scene. In some implementations, the optical flow determining unit 346 determines the current optical flow when the AR/VR display(s) 312 are playing content that does not correspond to the scene (e.g., when the AR/VR display(s) 312 are playing content that corresponds to a movie, a game or a video chat instead of displaying an optical/video see through of the scene).

In various implementations, the optical flow determining unit 346 includes instructions and/or logic, and heuristics and metadata for performing the operations described herein.

In various implementations, the movement detecting unit 348 determines that an object at the scene is moving based on the expected optical flow and the current optical flow. In some implementations, the movement detecting unit 348 compares the current optical flow with the expected optical flow, and determines whether the current optical flow is different from the expected optical flow. In some implementations, the movement detecting unit 348 determines that an object at the scene is moving in response to the current optical flow being different from the expected optical flow. In some implementations, the movement detecting unit 348 determines which object at the scene is moving based on the difference between the current optical flow and the expected optical flow. For example, the movement detecting unit 348 identifies a pixel location where the current optical flow and the expected optical flow differ, and determines the object that corresponds to the pixel location where the current optical flow and the expected optical flow differ. In some implementations, the movement detecting unit 348 determines a movement characteristic of the moving object based on the difference between the current optical flow and the expected optical flow. For example, the movement detecting unit 348 determines a speed or a velocity of the moving object.

In some implementations, the movement detecting unit 348 causes the AR/VR presenting unit 344 to display an indication of the moving object on the AR/VR display 312. For example, in some implementations, the movement detecting unit 348 causes the AR/VR presenting unit 344 to display a notification on the AR/VR display 312. In some implementations, the movement detecting unit 348 causes the AR/VR presenting unit 344 to change a visual characteristic of the moving object so that the moving object is visually distinguishable from other objects that are not moving. For example, the movement detecting unit 348 causes the AR/VR presenting unit 344 to display a polygon (e.g., a rectangle, a square, a circle, etc.) around the moving object. In some implementations, the movement detecting unit 348 causes the AR/VR presenting unit 344 to highlight the moving object (e.g., by changing a background color of a display region that corresponds with the moving object). In some implementations, the movement detecting unit 348 displays the indication when a movement characteristic of the moving object exceeds a threshold (e.g., when a speed of the moving object exceeds a threshold speed).

In some implementations, the movement detecting unit 348 causes the data transmitting unit 350 to transmit an indication of the movement. In some implementations, the movement detecting unit 348 causes the data transmitting unit 350 to transmit a notification to the controller 200. In some implementations, the movement detecting unit 348 causes the data transmitting unit 350 to transmit the notification to another device that is in electronic communication with the HMD 300 (e.g., a mobile communication device, a tablet, a computer, etc.).

In some implementations, the movement detecting unit 348 updates the model of the scene in response to detecting the movement of objects. As described herein, in some implementations, the expected optical flow is based on the depth data from the model. As such, in some implementations, the movement detecting unit 348 causes the expected optical flow to be updated based on movement of objects at the scene. In some implementations, the movement detecting unit 348 causes the model and/or the expected optical flow to be updated after a predetermined amount of time has passed since the movement ceased. For example, if the movement detecting unit 348 detects that a table in a meeting room has been moved, the movement detecting unit 348 causes the model and/or the expected optical flow of the meeting room to be updated after 24 hours have passed since the table movement ceased. Updating the model and/or the expected optical flow after the predetermined amount of time passes reduces the likelihood of updating the model and/or expected optical flow unnecessarily.

In various implementations, the movement detecting unit 348 includes instructions and/or logic, and heuristics and metadata for performing the operations described herein.

In some implementations, the data transmitting unit 350 transmits data (e.g., an indication of movement detected by the movement detecting unit 348) to at least one of the controller 200 and the calibration device. To that end, in various implementations, the data transmitting unit 350 includes instructions and/or logic therefor, and heuristics and metadata therefor.

Although the data obtaining unit 342, the AR/VR presenting unit 344, the optical flow determining unit 346, the movement detecting unit 348, and the data transmitting unit 350 are shown as residing on a single device (e.g., the HMD 300), it should be understood that in some implementations, any combination of the data obtaining unit 342, the AR/VR presenting unit 344, the optical flow determining unit 346, the movement detecting unit 348, and the data transmitting unit 350 may be located in separate computing devices.

Moreover, FIG. 3 is intended more as a functional description of the various features which are present in some implementations as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 4:
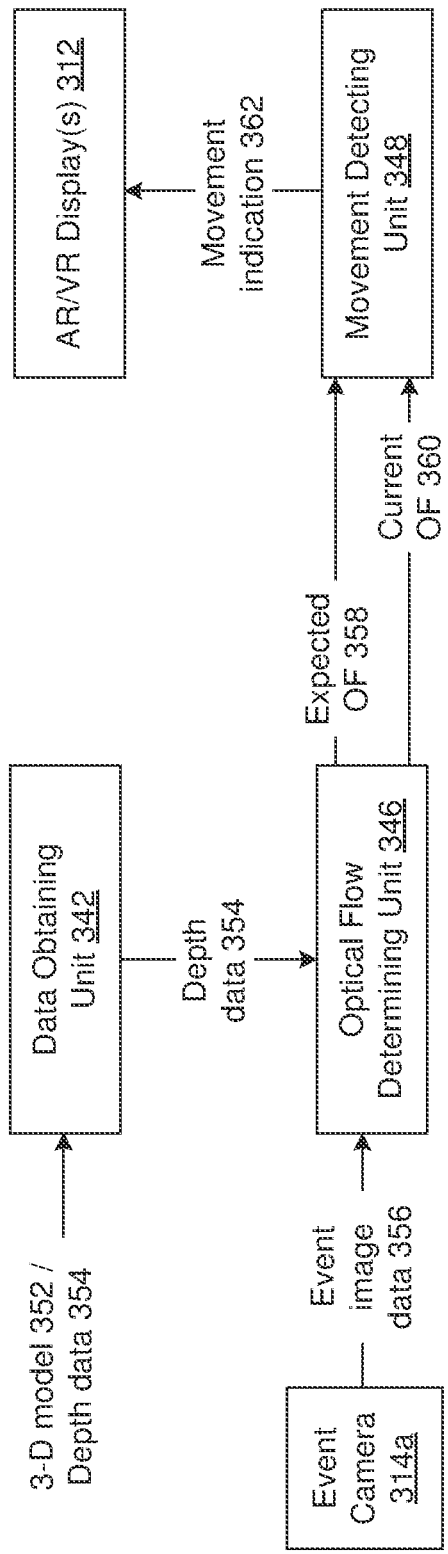
FIG. 4 is another block diagram of the HMD in accordance with some implementations.

FIG. 4 is a block diagram of the HMD 300 in accordance with some implementations. In various implementations, the data obtaining unit 342 obtains a 3D model 352 of the scene 105. In some implementations, the data obtaining unit 342 obtains depth data 354 associated with the scene. In some implementations, the data obtaining unit 342 retrieves depth data 354 from the 3D model 352. In various implementations, the depth data 354 indicates positions of various objects at the scene 105 relative to the HMD 300. In some implementations, the depth data 354 indicates distances of various objects from the HMD 300. In other words, in some implementations, the depth data 354 indicates how far each object is from the HMD 300. In some implementations, the data obtaining unit 342 obtains the depth data 354 from the depth camera 314b. In some implementations, the data obtaining unit 342 receives the 3D model 352 and/or the depth data 354 from the controller 200. In some implementations, the data obtaining unit 342 provides the depth data 354 to the optical flow determining unit 346.

In various implementations, the optical flow determining unit 346 synthesizes an expected optical flow (OF) 358 for the scene 105 based on the depth data 354. In some implementations, the expected optical flow 358 characterizes objects that are in the field of view of the event camera 314a. For example, referring to FIG. 1, the expected optical flow 358 characterizes the dog 160a and the ball 160b in the field of view 316 of the event camera 314a. In some implementations, the HMD 300 (e.g., the optical flow determining unit 346) receives the expected optical flow 358 for the scene 105 from another entity (e.g., the controller 200). In some implementations, the optical flow determining unit 346 provides the expected optical flow 358 to the movement detecting unit 348.

In various implementations, the optical flow determining unit 346 determines a current optical flow (OF) 360 for the scene 105 based on event image data 356 from the event camera 314a. In some implementations, the current optical flow 360 characterizes the objects in the field of view 316 of the event camera 314a. In various implementations, the event image data 356 indicates changes at the scene 105. In some implementations, the event image data 356 indicates changes in individual pixels. For example, the event image data 356 indicates which pixel registered a change in its intensity. In some implementations, the event image data 356 includes a stream of asynchronous spikes with pixel location, sign and timing indicating when individual pixels record a threshold log intensity change. In some implementations, the optical flow determining unit 346 provides the current optical flow 360 to the movement detecting unit 348.

In various implementations, the movement detecting unit 348 determines whether or not an object at the scene 105 is moving based on the expected optical flow 358 and the current optical flow 360. In some implementations, the movement detecting unit 348 compares the current optical flow 360 with the expected optical flow 358 to determine whether the current optical flow 360 is different from the expected optical flow 358. In some implementations, the movement detecting unit 348 determines that an object at the scene 105 is moving in response to the current optical flow 360 being different from the expected optical flow 358. In some implementations, the movement detecting unit 348 identifies which object at the scene 105 is moving based on the difference between the expected optical flow 358 and the current optical flow 360. For example, the movement detecting unit 348 identifies the pixel(s) that are different in the current optical flow 360 relative to the expected optical flow 358, and the object(s) that correspond to (e.g., occupy) the pixel(s).

In some implementations, the movement detecting unit 348 synthesizes a movement indication 362 to indicate that an object in the scene 105 is moving. In some implementations, the movement detecting unit 348 sends the movement indication 362 to the AR/VR display 312. In some implementations, the AR/VR display 312 presents a notification to indicate that the HMD 300 has detected a moving object at the scene 105. In some implementations, the AR/VR display 312 highlights the moving object, for example, by rendering a polygon around the moving object. In some implementations, the HMD 300 plays an audible sound to alert the user of the HMD 300 that the HMD 300 has detected a moving object at the scene 105. More generally, in various implementations, the HMD 300 presents the movement indication 362 in order to indicate that the HMD 300 has detected a moving object at the scene 105. In some implementations, the movement detecting unit 348 causes the presentation of the movement indication 362 when the AR/VR display 312 is not displaying content that corresponds to the scene (e.g., when the AR/VR display 312 is displaying content that corresponds to a movie, a game or a video chat instead of displaying an optical/video see through of the scene).

Figure 5:
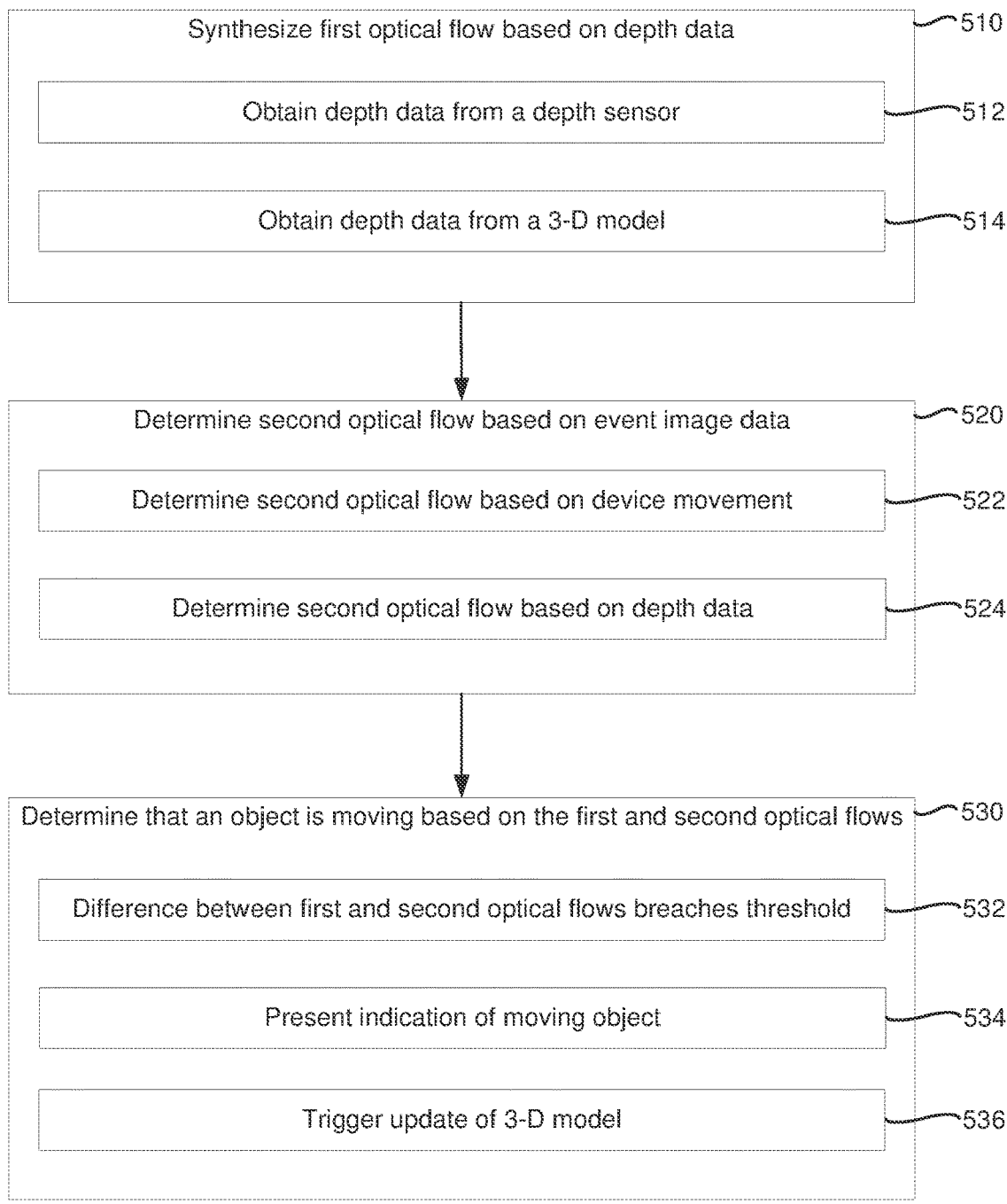
FIG. 5 is a flowchart representation of a method of detecting moving objects in accordance with some implementations.

FIG. 5 is a flowchart representation of a method 500 of detecting moving objects in accordance with some implementations. In various implementations, the method 500 is performed by a HMD with a display, an event camera, a non-transitory memory, and one or more processors (e.g., the HMD 300 shown in FIGS. 1, 3 and 4). In some implementations, the method 500 is performed by processing logic, including hardware, firmware, software, or a combination thereof. In some implementations, the method 500 is performed by a processor executing code stored in a non-transitory computer-readable medium (e.g., a memory). Briefly, in some implementations, the method 500 includes synthesizing a first optical flow based on depth data (e.g., an expected optical flow), determining a second optical flow based on event image data (e.g., a current optical flow), and determining that an object is moving based on the first and second optical flows.

As represented by block 510, in various implementations, the method 500 includes synthesizing a first optical flow (e.g., the expected optical flow 358 shown in FIG. 4) characterizing one or more objects in a field of view of the event camera based on depth data associated with the one or more objects. As represented by block 512, in some implementations, the method 500 includes obtaining the depth data from a depth sensor. For example, in some implementations, the method 500 includes obtaining the depth data (e.g., the depth data 354 shown in FIG. 4) from a depth camera (e.g., the depth camera 314b shown in FIGS. 1 and 3). As represented by block 514, in some implementations, the method 500 includes obtaining the depth data from a 3D model of the scene. For example, in some implementations, the method 500 includes obtaining a 3D model of the scene (e.g., the 3D model 352 shown in FIG. 4), and extracting the depth data from the 3D model. In some implementations, obtaining the 3D model includes receiving the 3D model via a receiver of the HMD. In some implementations, obtaining the 3D model includes constructing the 3D model at the HMD.

As represented by block 520, in various implementations, the method 500 includes determining a second optical flow (e.g., a current optical flow, for example, the current optical flow 360 shown in FIG. 4) characterizing the one or more objects in the field of view of the event camera based on event image data provided by the event camera. As represented by block 522, in some implementations, the method 500 includes determining the second optical flow based on a function of movement of the HMD, the depth data and the event image data. For example, in some implementations, the second optical flow is a function of rotational movement of the HMD, tilting of the HMD and/or translational movement of the HMD. As represented by block 524, in some implementations, the method 500 includes determining the second optical flow based on the depth data associated with the scene. In various implementations, determining the second optical flow based on event image data provided by the event camera enhances the operability of the HMD, for example, by allowing the HMD to detect moving objects while utilizing a reduced bitrate, reducing power consumption and/or reducing hear generation.

As represented by block 530, in various implementations, the method 500 includes determining that an object at the scene is moving based on the first optical flow and the second optical flow. In various implementations, determining that the object is moving based on the first and second optical flows enhances the operability of the HMD, for example, by detecting moving objects with a reduced bitrate, lower power consumption and/or lower heat generation. As represented by block 532, in some implementations, the method 500 includes determining whether there is a difference between the first optical flow and the second optical flow. In some implementations, the method 500 includes determining that an object at the scene is moving in response to determining that the difference between the first optical flow and the second optical flow is greater than a threshold c (e.g., as expressed by expression 1).

$$|OF_{expected} - OF_{current}| = \Delta OF > \varepsilon \qquad \text{(Expression 1)}$$

As represented by block 534, in some implementations, the method 500 includes presenting an indication (e.g., the movement indication 362 shown in FIG. 4) that an object at the scene is moving. In some implementations, the method 500 includes rendering a polygon around the moving object. In some implementations, the method 500 includes highlighting the moving object by changing a display property of the moving object (e.g., by changing a background color of the display region that corresponds to the moving object). In some implementations, the method 500 includes playing an audible sound to alert the user of the HMD that an object at the scene is moving. In some implementations, the method 500 includes displaying a notification on the AR/VR display to indicate the movement of the object. In some implementations, the method 500 includes presenting the indication in response to the movement exceeding a threshold speed. In various implementations, presenting an indication that an object at the scene is moving enhances the operability of the HMD, for example, by allowing the HMD to provide information regarding the scene while displaying content that does not correspond to the scene.

As represented by block 536, in some implementations, the method 500 includes triggering an update of the 3D model for the scene based on the movement of the object at the scene. In some implementations, the method 500 includes triggering an update of the 3D model for the scene in response to determining that a predetermined amount of time has passed since movement of the object ceased. Updating the model after the movement ceases for a predetermined amount of time prevents unnecessary updates to the model. In some implementations, the method 500 includes transmitting pixel updates to another device (e.g., the controller 200) in response to determining that the object is moving. In some implementations, the pixel updates include pixel data that corresponds to the moving object(s). In various implementations, triggering an update to the 3D model enhances the operability of the HMD, for example, by preventing erroneous detections of moving objects thereby reducing power consumption and/or heat generation by the HMD.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular embodiments only and is not intended to be limiting of the claims. As used in the description of the embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
   at a device including an image sensor, a non-transitory memory, and one or more processors coupled with the image sensor and the non-transitory memory:
   obtaining depth data associated with one or more objects in a field of view of the image sensor;
   determining a first optical flow characterizing one or more objects based on the depth data and movement of the device;
   obtaining image data of the one or more object in the field of view of the image sensor;
   determining a second optical flow characterizing the one or more objects based on the image data; and
   determining that a first object of the one or more objects is moving based on the first optical flow and the second optical flow.

2. The method of claim 1, wherein the first optical flow indicates a first amount of change in position of the first object based on the movement of the device and a second amount of change in position of a second object of the one or more objects based on the movement of the device, wherein the second amount is different than the first amount.

3. The method of claim 2, wherein the first amount is based on a depth of the first object and the second amount is based on a depth of the second object.

4. The method of claim 1, wherein obtaining the depth data includes:
   obtaining a three-dimensional (3D) model associated with the one or more objects; and
   determining the depth data based on the 3D model.

5. The method of claim 4, wherein obtaining the 3D model comprises receiving the 3D model and/or constructing the 3D model.

6. The method of claim 1, wherein the device further includes a depth sensor and wherein obtaining the depth data includes obtaining the depth data from the depth sensor.

7. The method of claim 1, wherein the device determines that the first object is moving while the device is moving.

8. The method of claim 1, further comprising presenting an indication that the first object is moving.

9. The method of claim 8, wherein presenting the indication comprises displaying a notification on a display of the device and/or playing an audible sound via a speaker of the device.

10. The method of claim 1, further comprising transmitting pixel data associated with the first object in response to determining that the first object is moving.

11. The method of claim 1, further comprising triggering an update to the depth data in response to determining that the first object is moving, wherein the update to the depth data indicates a new position of the first object after the first object ceases to move.

12. The method of claim 11, wherein triggering the update comprises updating a 3D model to indicate the new position of the first object.

13. The method of claim 1, wherein determining the second optical flow is further based on the depth data and the movement of the device.

14. The method of claim 1, wherein the second optical flow is based on the first optical flow.

15. A device comprising:
   one or more processors;
   a non-transitory memory;
   an image sensor; and
   one or more programs stored in the non-transitory memory, which, when executed by the one or more processors, cause the device to:
      obtain depth data associated with one or more objects in a field of view of the image sensor;
      determine a first optical flow characterizing one or more objects based on the depth data and movement of the device;
      obtain image data of the one or more object in the field of view of the image sensor;
      determine a second optical flow characterizing the one or more objects based on the image data; and
      determine that a first object of the one or more objects is moving based on the first optical flow and the second optical flow.

16. The device of claim 15, wherein the first optical flow indicates a first amount of change in position of the first object based on the movement of the device and a second amount of change in position of a second object of the one or more objects based on the movement of the device, wherein the second amount is different than the first amount.

17. The device of claim 16, wherein the first amount is based on a depth of the first object and the second amount is based on a depth of the second object.

18. The device of claim 15, further comprising a depth sensor, wherein the one or more programs cause the device to obtain the depth data from the depth sensor.

19. The device of claim 15, wherein the one or more programs further caused the device to present an indication that the first object is moving.

20. A non-transitory computer-readable medium storing one or more programs, which, when executed by one or more processors of a device with an image sensor, cause the device to:
   obtain depth data associated with one or more objects in a field of view of the image sensor;
   determine a first optical flow characterizing one or more objects based on the depth data and movement of the device;
   obtain image data of the one or more object in the field of view of the image sensor;
   determine a second optical flow characterizing the one or more objects based on the image data; and
   determine that a first object of the one or more objects is moving based on the first optical flow and the second optical flow.

* * * * *